United States Patent
Shore et al.

(10) Patent No.: US 6,564,193 B1
(45) Date of Patent: May 13, 2003

(54) SYSTEM FOR, AND METHOD OF, USING THE INTERNET SYSTEM TO PROVIDE FOR THE TRANSMISSION OF A FACSIMILE MESSAGE

(75) Inventors: Barry F. Shore, Marina Del Rey, CA (US); Mark R. Schwartz, Calabassas, CA (US)

(73) Assignee: fax4free.com, Inc., Marina de Rey, CA (US)

(*) Notice: Subject to any disclaimer, the term of this patent is extended or adjusted under 35 U.S.C. 154(b) by 0 days.

(21) Appl. No.: 09/231,465

(22) Filed: Jan. 14, 1999

(51) Int. Cl.[7] ............................................... G06F 17/60
(52) U.S. Cl. ............. 705/400; 379/100.01; 379/100.03; 379/100.04; 705/418
(58) Field of Search ........................ 379/100.01, 100.03, 379/100.04; 705/1, 400, 418

(56) References Cited

U.S. PATENT DOCUMENTS

| | | | | |
|---|---|---|---|---|
| 5,068,888 A | * | 11/1991 | Scherk et al. | 379/100.11 |
| 5,848,397 A | * | 12/1998 | Marsh et al. | 705/14 |
| 5,864,606 A | * | 1/1999 | Hanson et al. | 379/88.18 |
| 5,937,037 A | * | 8/1999 | Kamel et al. | 379/88.18 |
| 6,094,482 A | * | 7/2000 | Tajima et al. | 713/186 |

FOREIGN PATENT DOCUMENTS

EP           0833490 A2  *  4/1998

OTHER PUBLICATIONS

Wilder: "Free E-Mail—For A Price"; Information Week, Nov. 27, 1995, No. 555, p. 84.*

Sloboda: "What's free on the Internet: An update for user's"; Management Quarterly, Summaer 2001, vol. 42, No. 2, pp. 25–43.*

* cited by examiner

*Primary Examiner*—Edward R. Cosimano
(74) *Attorney, Agent, or Firm*—Fulwider, Patton et al.; Ellsworth R. Roston

(57) ABSTRACT

A document is processed by a web server at a web site to determine from a customer whether the customer wishes to facsimile the document to a recipient for free or for a fee. If the customer indicates the customer's desire to facsimile the document for free, a message, preferably an advertisement, is added by the web server to the facsimile document before the document is facsimiled to the recipient. Preferably the advertisement is disposed by the web server in the vertical blank spaces at the opposite sides of the document. Before the document is sent, the web server determines from the customer through the Internet system whether the customer is a first time user at the web site and, if so, the web server obtains background information through the Internet system concerning the customer. If the customer is sending the facsimile document for a fee, the web server makes certain at the web site that the customer has sufficient money in the customer's account to pay for the cost of sending the facsimile to the recipient. The customer may communicate with the web server at the web site through the Internet system either from a web browser hooked into the Internet system or from a desk top individual to the customer and pre-connected by printer driver software to the web site of the service provider. A facsimile server is provided at the web site to send the facsimile message through telephone lines to the recipient.

53 Claims, 9 Drawing Sheets

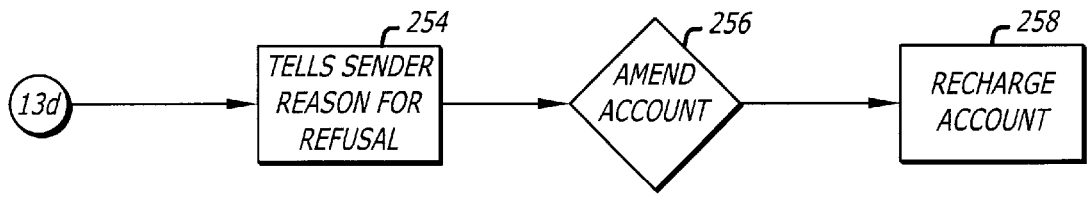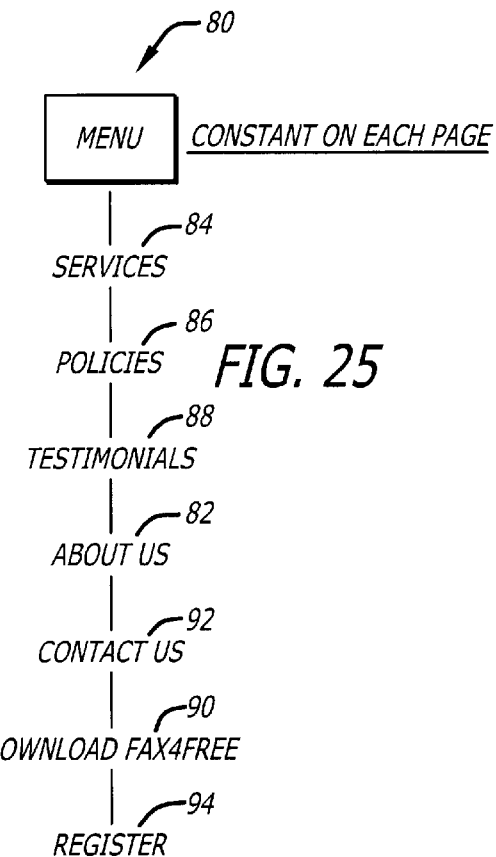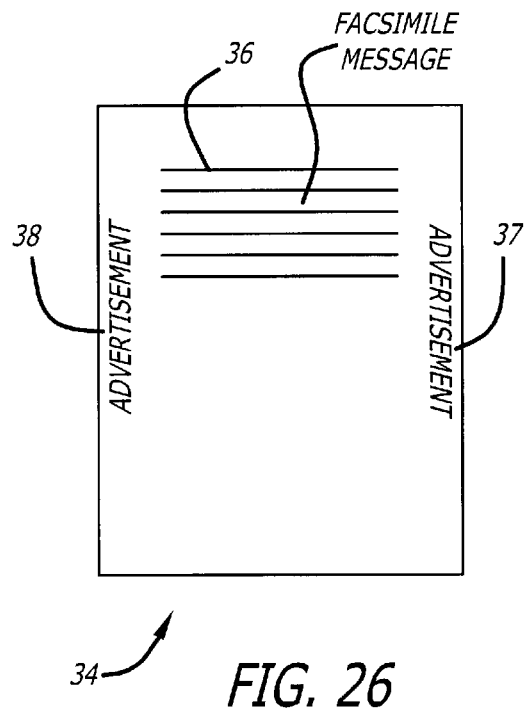

SYSTEM FOR, AND METHOD OF, USING THE INTERNET SYSTEM TO PROVIDE FOR THE TRANSMISSION OF A FACSIMILE MESSAGE

This invention relates to a system for, and method of, sending facsimile documents either on a free basis or a fee basis at the choice of a customer who is sending the document. The invention also relates to a system for, and a method, of using the Internet system to send the document by facsimile either on the free basis or the fee basis.

BACKGROUND OF THE INVENTION

Commercial organizations send facsimiles in great volume to recipients daily. For example, a worldwide organization such as Hilton Hotels may send hundreds of thousands of facsimiles every month either on its own behalf or on behalf of its room occupants. A worldwide organization such as Hilton Hotels then has to absorb the cost of sending such facsimiles on its own behalf or has to charge its room occupants for the costs of sending the facsimiles requested by its room occupants.

An organization such as Hilton Hotels would like to be relieved of the financial burden of sending facsimiles on its own behalf and on behalf of its room occupants. Organizations such as Hilton Hotels have wrestled with the problem of obtaining relief from such financial burdens but have been unable to provide a system or adopt a method for accomplishing this. It will be appreciated that Hilton Hotels is used only as an example to indicate the problems involved and that there are a large number of organizations which would like to eliminate similar financial burdens.

BRIEF DESCRIPTION OF THE INVENTION

This invention involves a system for, and method of, eliminating the financial burden to organizations such as Hilton Hotels in sending facsimiles to recipients on its own behalf and on behalf of its room occupants. In one embodiment of the invention, a document to be sent by facsimile by a customer (e.g. Hilton Hotels) to a recipient is processed by a web server at a web site to determine from the customer whether the customer wishes to send the document for free or for a fee.

If the customer indicates the customer's desire to facsimile the document for free, a message, preferably an advertisement, is added by the web server at the web site to the facsimile document before the document is facsimiled to the recipient. Preferably the advertisement is disposed by the web server at the web site in the vertical blank spaces at the opposite sides of the document. Before the document is facsimiled, the web server determines from the customer through the Internet system whether the customer is a first time user at the web site and, if so, the web server obtains background information through the Internet system concerning the customer. If the customer is sending the facsimile document for a fee, the web server makes certain that the customer has sufficient money in the customer's account to pay for the cost of sending the document to the recipient.

The customer may communicate with the web server through the Internet system either from a web browser hooked into the Internet system or from a desk top individual to the customer and pre-connected by software known as a printer driver to the web site of the service provider. A facsimile server is provided at the web site to send the facsimile message through telephone lines to the recipient.

BRIEF DESCRIPTION OF THE DRAWINGS

In the drawings:

FIGS. 19 through 24 are flow charts showing the steps involved, either on a free basis or a fee basis, of sending the facsimile of the document from the web site;

FIG. 25 is a menu providing information about various topics of possible interest to the customer including the identity and business of the organization controlling the web site and including additional information concerning the sending of the facsimile documents on a free basis or a fee basis;

FIG. 26 is a schematic view of a document sent to a recipient by facsimile on a free basis and shows the facsimile message in the central portion of the document and additional messages (e.g. advertisements) along either or both the right and left boundaries of the facsimile message in the document.

DETAILED DESCRIPTION OF THE INVENTION

Figure 1:
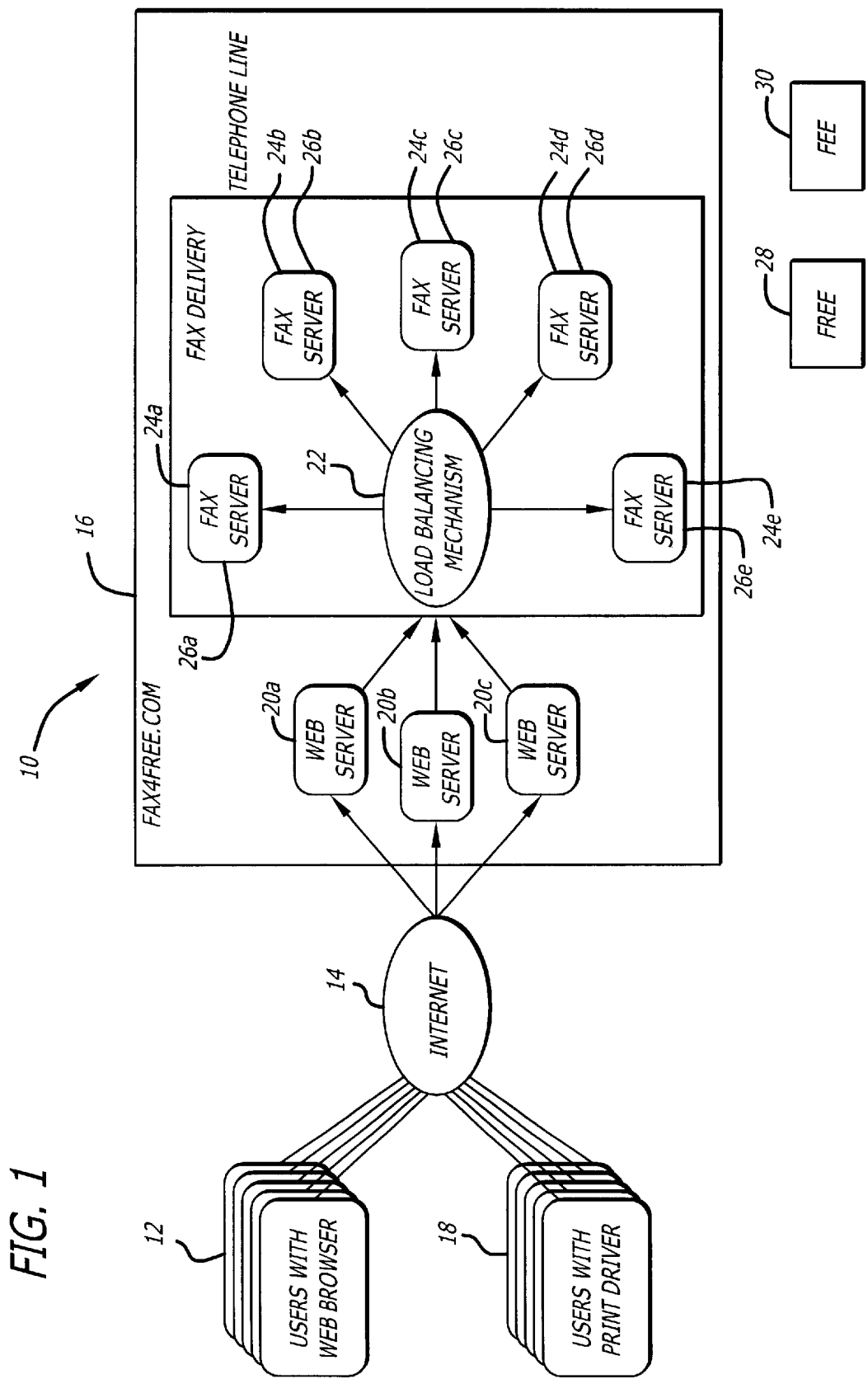
FIG. 1 is a schematic block diagram of a system for using the Internet system to provide for a sending of a document by facsimile either on a free basis or a fee basis from a web site to a recipient in accordance with instructions from a customer or user.

FIG. 1 shows in block form a system generally indicated at 10 and constituting one embodiment of the invention. The system 10 includes a web browser 12 which can be used by a customer to provide a document for transmission through an Internet system 14 to a web site 16 of a service provider. A desk top computer 18 individual to the customer can also be used to provide a document for transmission through the Internet system 14 to the web site 16 of the service provider. The desk top computer 18 is preferably pre-connected to the web site via free software known as a printer driver and downloaded from the web site.

The web site 16 includes a plurality of web servers 20a, 20b and 20c. Although three web servers are shown, it will be appreciated that any number of web servers can be used depending upon the volume of documents being, or to be facsimiled. The web servers 20a, 20b and 20c are coupled in the web site 16 through a load balancing mechanism 22 to a plurality of facsimile (fax) servers 24a–24e in the web site. Although five (5) facsimile servers are shown, it will be appreciated that any number of facsimile servers may be used depending upon the number of documents being facsimiled.

The load balancing mechanism 22 distributes the facsimile documents from the web servers 20a–20c to the facsimile servers 24a–24e so that each of the facsimile servers will have approximately an even distribution of facsimile documents in comparison to the number of the facsimile documents received by the other ones of the facsimile servers. The facsimile outputs from the facsimile servers 24a–24e are respectively introduced to telephone lines 26a–26e which transmit the facsimile signals to the recipient(s) of the messages in the facsimile documents.

Two boxes 28 and 30 are provided for the system of FIG. 1 to control whether the system provides a facsimile on a free basis or a fee basis. When checked, the first box 28 provides for a facsimile on a free basis. When checked, the second box 30 provides for a facsimile on a fee basis. When neither of the boxes 28 and 30 is checked, the system of FIG. 1 may provide for a facsimile on a free basis.

The customer may communicate with the web site 16 through the Internet system 14 in either of two (2) different modes. When the user communicates with the web site 16 through the web browser 12, it provides this communication from a web browser such as that provided by Microsoft or Netscape. Alternatively, the customer may communicate with the web servers 20a–20c in the web site 16 through the desk top computer 18 which includes a printer driver. In either mode, the web servers 20a–20c communicate with the facsimile servers 24a–24e, which then respectively provide the facsimile signals through the telephone lines 26a–26e.

The system 10 in FIG. 1 is able to provide the facsimiles to the recipient on a free basis by incorporating an additional message or messages in the facsimile document. This is shown schematically in FIG. 26. FIG. 26 shows a facsimile document, generally indicated at 34, with a facsimile message 36 preferably in the central portion of the document and additional messages (e.g. advertisements 37 and 38) in blank portions of the document respectively to the right and left of the central message 34. The lettering in the facsimile message 36 may extend in substantially horizontal lines substantially vertically displaced from one another. The lettering in the advertisements 37 and 38 may extend in a direction substantially perpendicular to the horizontal direction of the lines in the message 36. The advertiser of the advertisements 37 and 38 pays for the advertisements. For example, the advertisement may relate to a particular automobile model. This allows the service provider at the web site 16 to send the facsimile document 36 to the recipient without any charge to the customer and still make a profit.

It is advantageous for the advertisements 37 and 38 to be substantially perpendicular to the message 36 so that the advertisements will not be construed to be a part of the message 36. If the customer and/or the recipient are commercial organizations, the advertisements 37 and 38 are preferably chosen so as not to be offensive or contradictory to their businesses. Although the advertisements preferably have the positions shown in FIG. 26, it will be appreciated that the advertisements may have other positions on the facsimile document 34. For example, the advertisements may appear at positions above and/or below the facsimile message 36 and may extend in successive horizontal lines.

Figure 2:
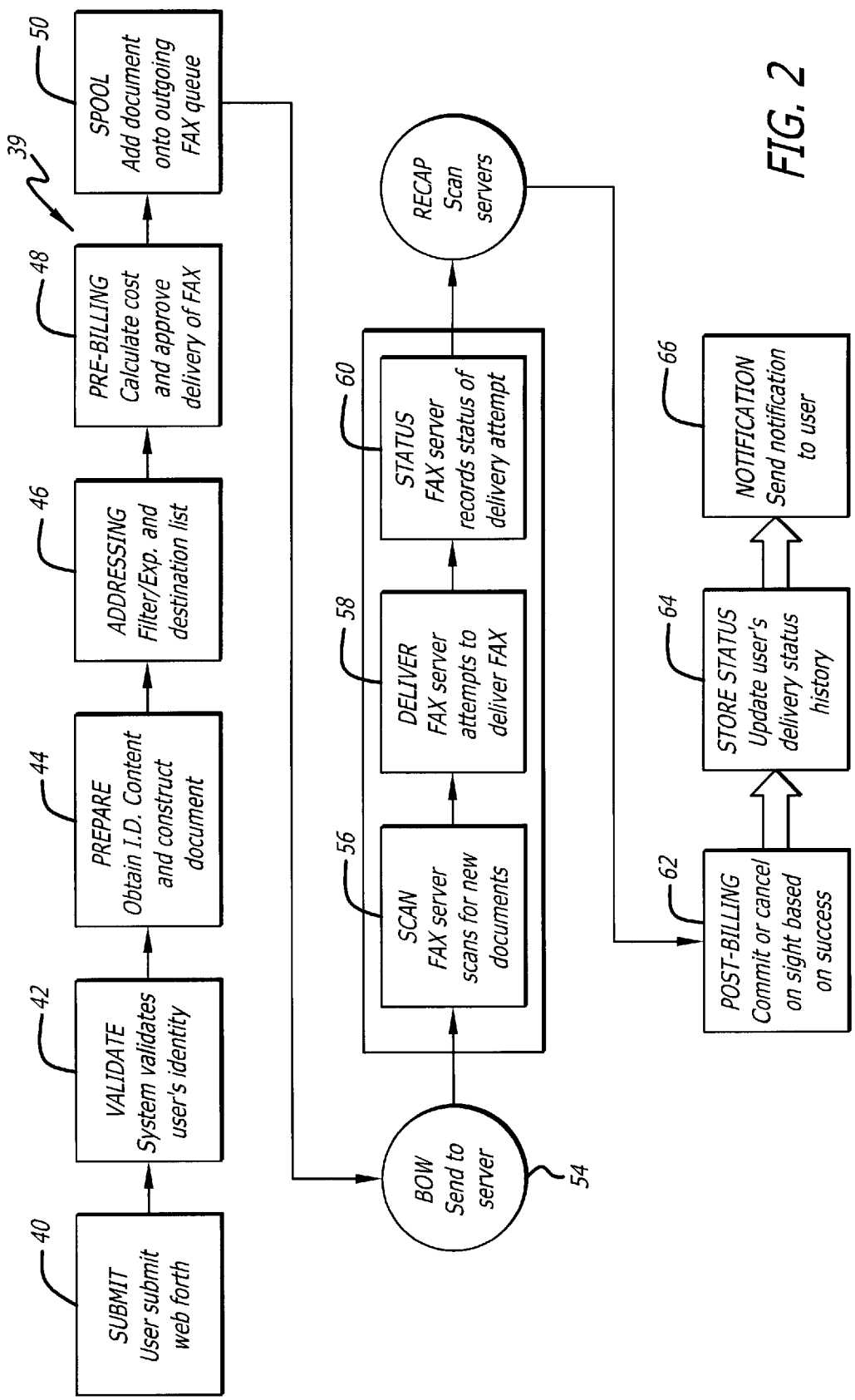
FIG. 2 is a schematic block diagram showing on an overview basis the steps used by the system shown in FIG. 1 in sending the document by facsimile from the web site to the recipient either on the free basis or the fee basis in accordance with instructions from the customer or user.

FIG. 2 is a flow chart, generally indicated at 39, showing the operation in successive steps of the system shown in FIG. 1 when the system is operating on a free basis or a fee basis. These successive steps are indicated in FIG. 2 at 40, 42, 44, 46, 48 and 50. When the system operates on a free basis, the system preferably includes the steps 40, 42, 44, 46 and 50 but does not include the step 48. When the system operates on a fee basis, the system preferably includes the steps 40, 42, 46, 48 and 50 but does not include the step 44.

In the step 40, the customer or user submits the document 34 (FIG. 26) (without the advertisements 36 and 38) to be facsimiled. In the step 42, the system 10 validates the identity of the customer or user. In the step 44, the system 10 adds the advertisements 36 and 38 to the document 34 when the document is to be facsimiled on a free basis. The system 10 then identifies the address of the recipient in the step 46. The document to be facsimiled for free is then added as at 50 to the queue of documents which are waiting to be transmitted from the web site 16. When the document 34 is to be facsimiled on a fee basis, the cost of providing a facsimile to the recipient is determined and this cost is approved at the web site 16. This is shown at 48 in FIG. 2. The document to be facsimiled for a fee is then added to the queue as at 50.

After the addition of the document 34 to the outgoing facsimile queue, the document is sent to an individual one of the facsimile servers 20a–20c as indicated at 54 in FIG. 2. The fax server then scans for new or additional documents as indicated at 56 in FIG. 2. The facsimile server attempts to deliver the facsimile to the recipient. This is indicated at 58 in FIG. 2. As indicated at 60 in FIG. 2, the facsimile server records the status of the delivery attempt. When the facsimile is being sent on a fee basis, the facsimile server commits or cancels the charge for the facsimile transmission depending upon whether or not the facsimile has been successfully transmitted to the recipient. This is indicated at 62 in FIG. 2. The delivery status history of the customer or user is then updated as at 64 and the customer or user is notified of the status of the delivery as indicated at 66.

Figure 3:
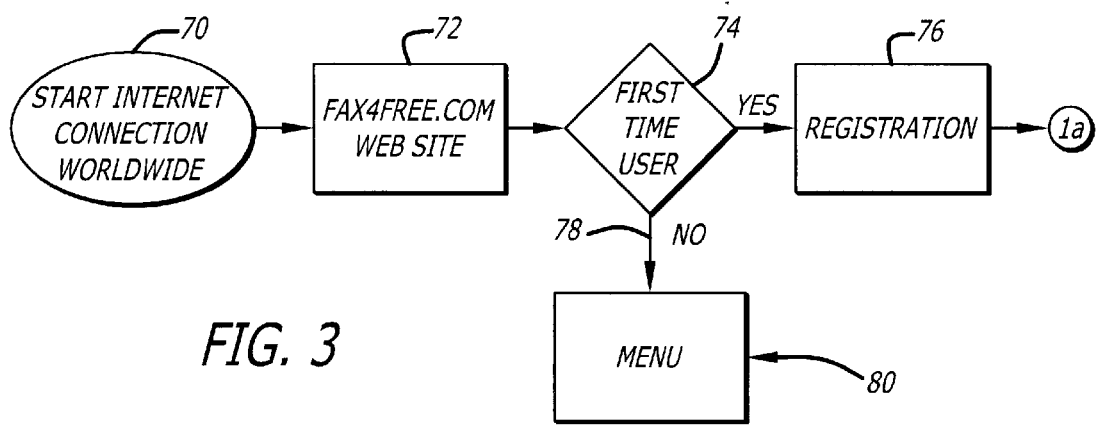
FIGS. 3 and 4 are flow charts showing steps involved in determining whether facsimile documents should be sent on a free basis or a fee basis to the recipient from the web site in accordance with the instructions of the customer.
Figure 4:
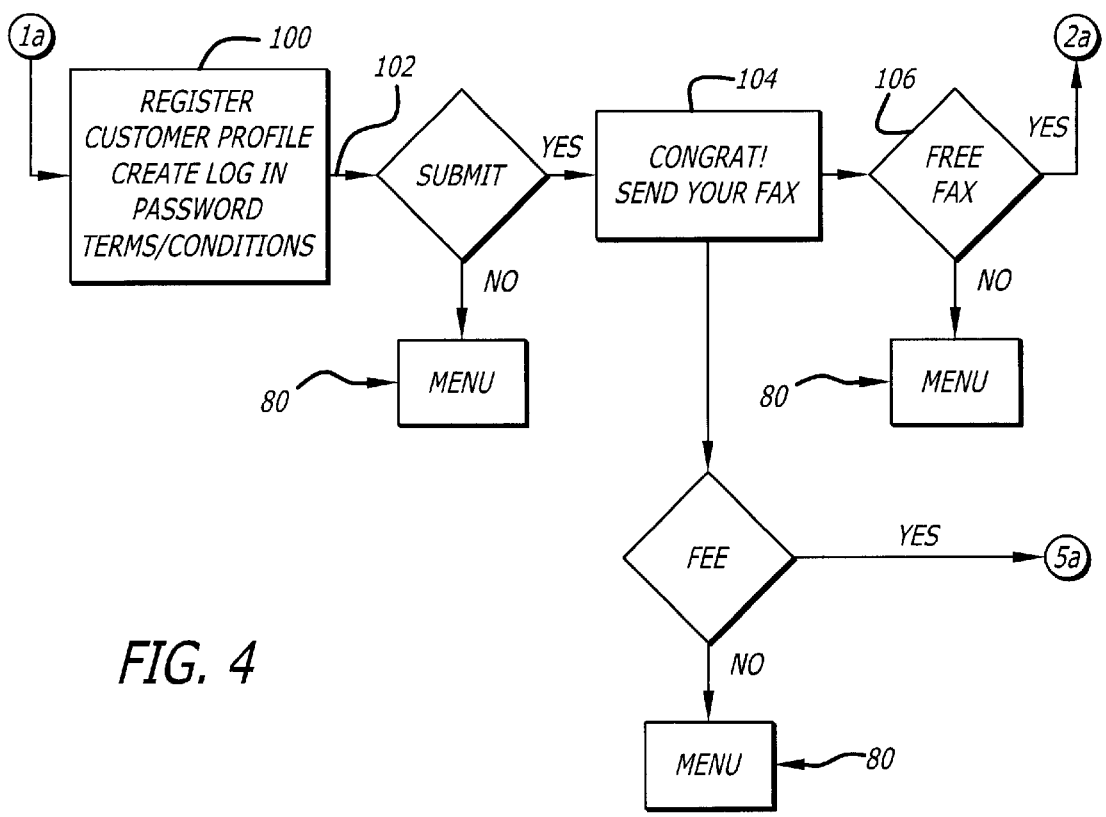

FIGS. 3 and 4 are flow charts showing steps involved at the web site 16 in determining whether facsimile documents should be sent on a free basis or a fee basis to a designated recipient from the web site of the service provider in accordance with instructions from the customer or user. As a first step 70 in FIG. 3, the customer or user communicates through the Internet system to the web site 16 the desire of the customer to send a facsimile to a recipient. This communication is received by the web site 16 as indicated at 72. The web site may illustratively be identified as "Fax 4 free.com". The web site determines at 74 from the customer or user whether the customer or user is a first time user. If the answer is "yes", the web site undertakes to register the customer or user at 76 as a first time user. The initiation of the registration is indicated at 1A in FIG. 3.

If the customer or user is not a first time user, an indication to this effect is produced at 78 in FIG. 3 and the customer or user is introduced to a menu generally indicated at 80 in FIGS. 3 and 25. The menu is intended to provide information about the service provider and about the different services (e.g. fax for free and fax for fee) offered by the service provider at the web site 16. A typical menu is shown in FIG. 25. However, it will be appreciated that other menus may be provided by the service provider at the web site 16 without departing from the scope of the invention.

The menu 80 shown in FIG. 25 may include a box 82 designated as "About Us". When this box is pressed, background information concerning the service provider is provided. When a box designated as "Services" is pressed as at 84, information concerning services (e.g. fax for free and fax for fee) offered by the service provider at the web site 16 is provided. A pressure against a box 86 designated as "Policies" provides an indication of the rules or policies adopted by the service provider in conducting its business of sending facsimiles to a designated recipient. Actuation of a button 88 designated as "Testimonials" causes testimonials to be provided from prior users who have been pleased with the facsimile services provided by the service provider at the web site 16. Depression of a "download fax 4 free" button 90 may cause information concerning the transmission of a facsimile on a free basis to be provided. This allows for a free downloading of the printer driver software to run the desk top computer. A "CONTACT US" button 92 may be depressed to contact the service provider with questions. If the member has used the service provider's services within a particular period of time such as thirty (30) days, the depression of a button 94 designated as "Register" may cause the customer or user to be immediately registered.

The initiation 1A of the registration of a first time customer or user at the right end of FIG. 3 is also shown at the left end of FIG. 4. Since the customer is a first time user, the customer provides to the web site 16 as at 100 a customer profile and receives a password individual to the customer. The web site 16 also provides terms and conditions as at 100 for the future relationship between the customer and the web site. The customer profile and the customer password may then be submitted as at 102 to the web site 16. If the customer declines to submit this information, the customer is directed to the menu 80 to receive additional information as shown in FIG. 25.

When the web site 16 has approved the customer profile and the customer password and the terms and conditions of the relationship between the customer and the service provider, the web site indicates such approval to the customer as at 104. The customer then selects, as indicated previously, whether to send the facsimile for a fee or for free. When the customer elects to send a free facsimile as at 106, this is indicated as at 2A in FIG. 4. When the customer elects to send the facsimile for a fee, this is indicated as at 5A in FIG. 4. The customer is directed to the menu 80 when he declines a free facsimile or when he declines a fee facsimile.

FIGS. 5 through 10 are flow charts showing on a more detailed basis steps involved in having the facsimile sent to the recipient on a free basis or a fee basis in accordance with an election of the customer or user. A decision by the customer to send a free facsimile is indicated at 2A at the right end of FIG. 4 and at the left end of FIG. 5. This is also indicated at 106 in FIGS. 4 and 5. Information is then provided at the web site concerning the identity of the service provider and the identity of the recipient and the text of the facsimile to be sent. For example, the name and address of the customer and the name and facsimile address of the recipient may be provided at the web site. This information may be provided at 110 in FIG. 5.

Figure 5:
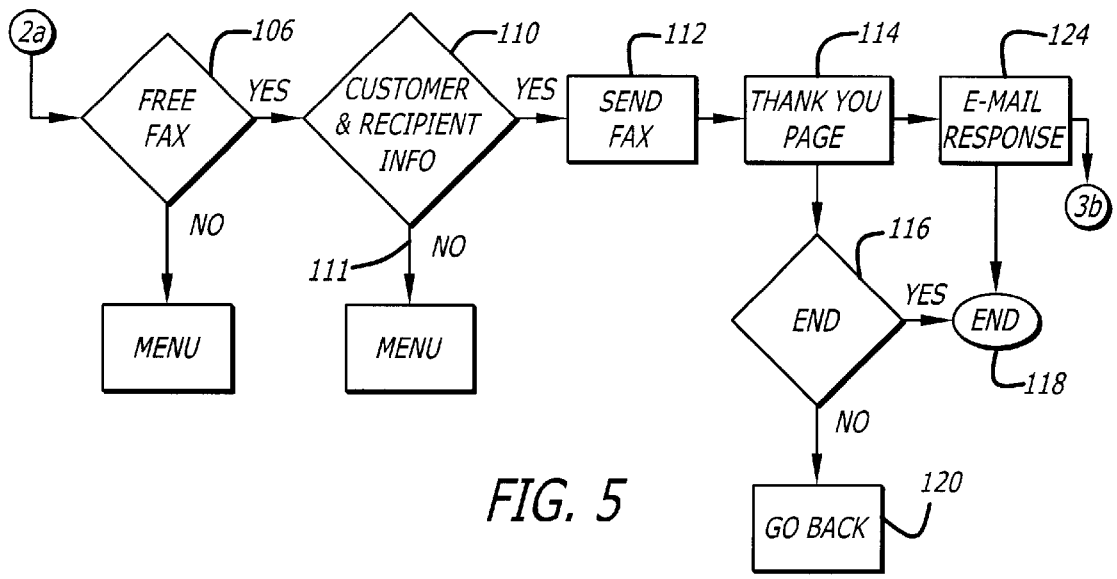
FIGS. 5 through 10 are flow charts showing on a more detailed basis steps involved in having the facsimile sent on a free basis or a fee basis in accordance with the election of the customer.

If the information at 110 is not correct, the customer is directed to the menu as at 111 in FIG. 5. If the information at 110 is correct and complete and a decision is made by the customer to send the facsimile to the recipient, the facsimile is sent to the recipient as indicated at 112. The service provider then thanks the customer through the Internet system as at 114 and provides as at 124 information to the customer about what happened to the facsimile. The web site then determines as at 116 whether this is the end of the facsimile message or there are additional pages to the facsimile. If this is the last page of the facsimile message, the end of the message is indicated at 118. If there is at least another page to the facsimile message, an indication is provided at 120 to return to the block 110 so that at least an additional page of the facsimile message is sent. This continues until the last page of the facsimile message has been sent to the recipient. The E-mail response for the facsimile pages to be sent is indicated at 124 in FIG. 5. It constitutes information to the customer about what happened to the facsimile.

Figure 6:
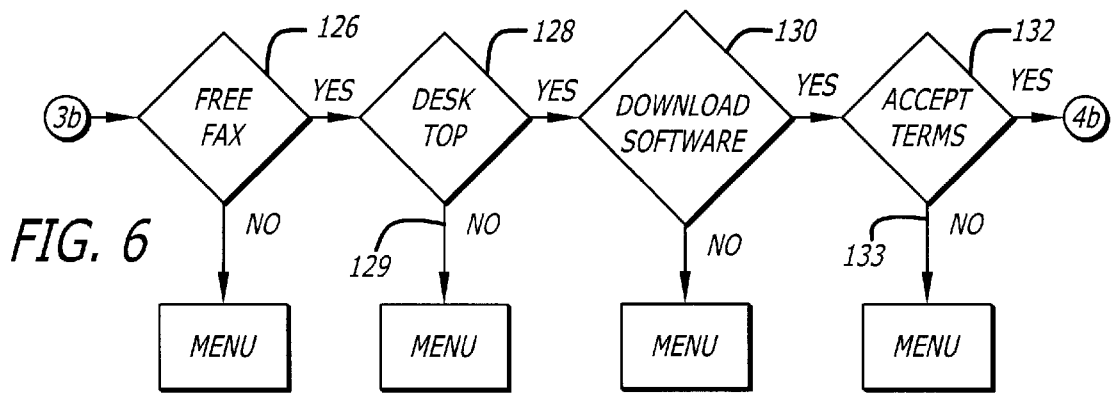
Figure 7:
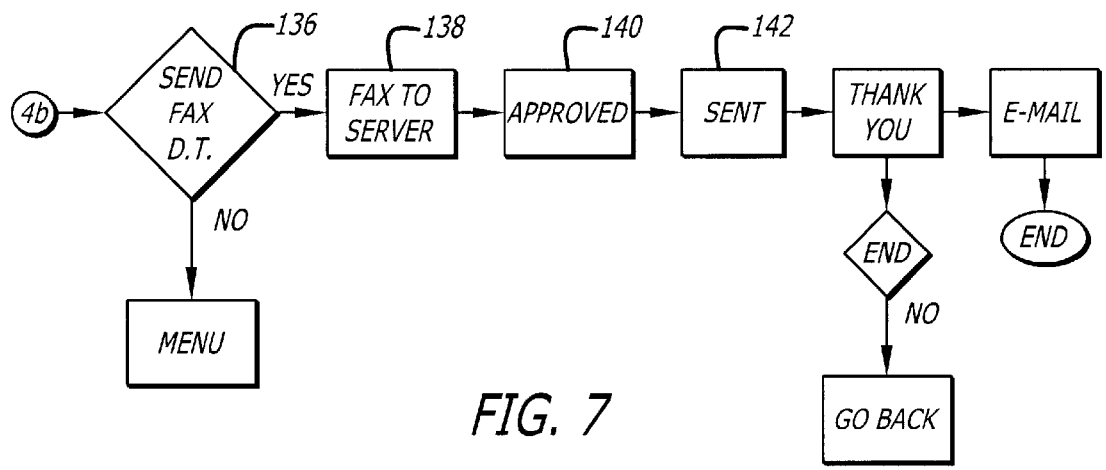

FIG. 6 shows in additional detail the interrelationship between the desk top 18 (FIG. 1) and the web site 16 in having a facsimile sent on a fee basis from the web site to the recipient. At 126 an indication is provided as to whether or not the facsimile to be sent by the web site 16 to the recipient is free or for a fee. If it is not for free, the customer is referred to the menu 80. If the facsimile is to be sent for free, a determination is made as at 128 as to whether the facsimile is to be provided from the customer's desk top. If the answer is "no", the customer is referred to the menu as indicated at 129 in FIG. 6. If the answer is "yes", the facsimile for free software is downloaded as at 130 from the menu at the web site 16. If this does not occur, the customer is referred to the menu 80 for further information.

When the fax 4 free software is downloaded at the web site 16, it includes terms and conditions for the relationship between the service provider at the web site and the customer. These terms and conditions are submitted to the customer at the desk top 18 as indicated at 132 in FIG. 6. One of these terms and conditions may indicate that the facsimile may include advertising in empty spaces in the facsimile document. For example, the facsimile document may include advertisements at the left and right boundaries of the facsimile document. Preferably the advertisement may extend in a direction between the bottom and top of the document to distinguish the facsimile message which extends from the left to right in the document. This is indicated at 36 and 38 in FIG. 26. If the customer does not accept such terms and conditions, the customer is referred to the menu 80 for further information. This is indicated at 133 in FIG. 6. If the customer accepts such terms and conditions, this is indicated at 4B at the right end of FIG. 6 and the left end of FIG. 7.

When the customer accepts the terms and conditions and the customer is operating from a desk top, the customer sends the facsimile message through the Internet system 14 (see 136 in FIG. 7) to an individual one of the web servers 20a–20c. As indicated at 138, the web server receives the facsimile. The individual one of the web servers 20a–20c then determines as at 140 if such information as the login and password from the desk top are valid. If they are valid, the web server sends the facsimile message to the recipient as indicated at 142 in FIG. 7. If the message constitutes more than one (1) page, the sending continues through the successive pages in a manner corresponding to that indicated at 114, 116, 118, 120 and 124 in FIG. 5.

FIG. 4 indicates at 5A an election by the customer to send a facsimile on a fee basis. This is also shown at the left end in FIG. 8. This is confirmed at 150 in FIG. 8. The customer may decide to pay the fee by a credit card. If so, the customer provides an indication of his credit card number and an indication of the amount of credit that he would like to be provided. This is indicated at 152 in FIG. 8. The customer then decides whether or not to submit this information to the web site 16. This is indicated at 154 in FIG. 8. If the customer does not submit this information, he is referred to the menu 80. If the customer submits this information to the web site as indicated at 155, the credit card application may be approved (see 156) or not approved (see 158).

Figure 8:
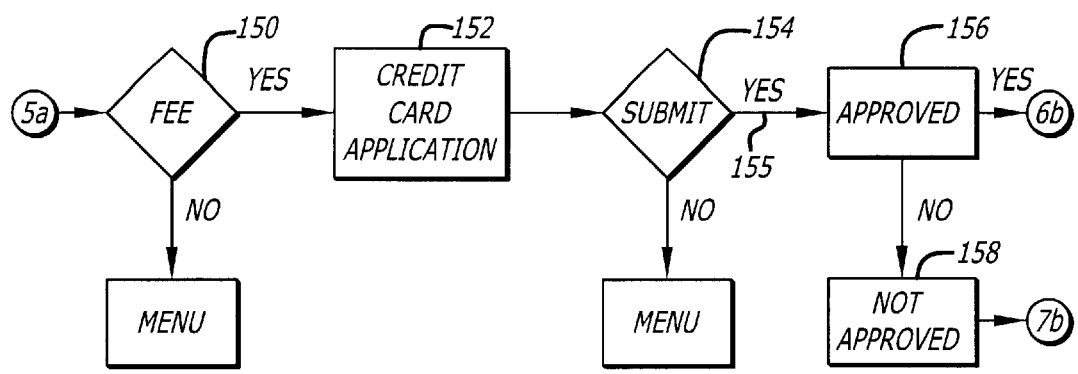
Figure 9:
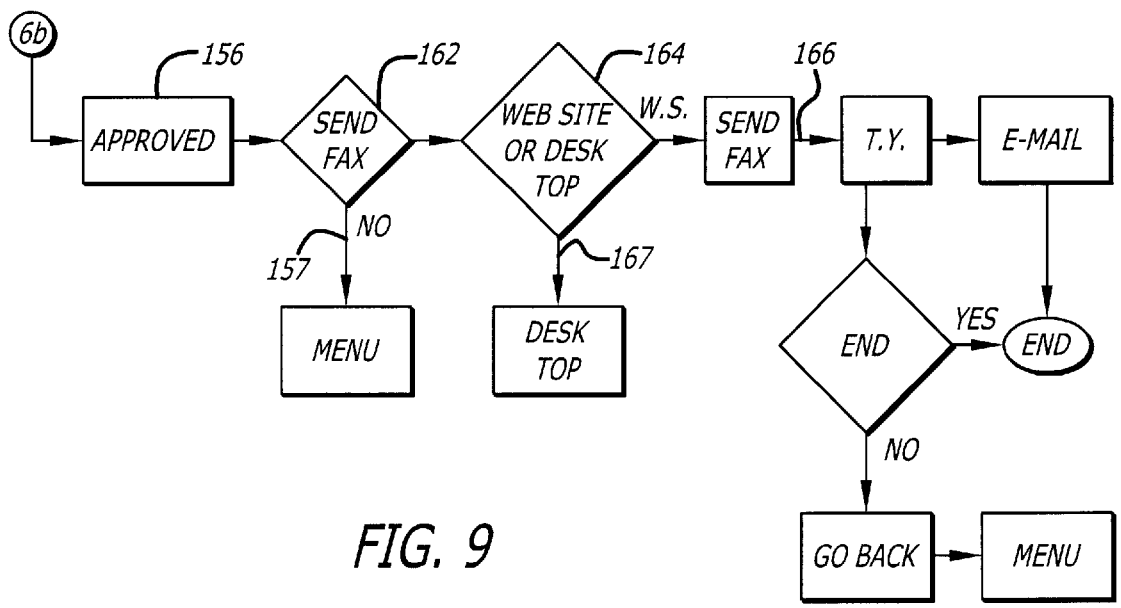

The approval of the credit card information is indicated at 6B at the right end of FIG. 8 and the left end of FIG. 9. If the credit card information is not approved, the customer is directed to the menu as indicated at 157. The approval as at 156 for sending the facsimile for a fee in FIG. 8 is duplicated in FIG. 9. The customer then re-affirms as at 162 that he wishes to send the facsimile to the recipient and indicates at 164 whether he wishes to have the facsimile sent from the desk top 18 or from the web site 16. In accordance with the election of the customer, the facsimile may be sent from the web site 16. The document may constitute one (1) or several pages. In either case, all of the pages are sent as indicated generally at 166. The general indication 166 corresponds to the blocks 114, 116, 118, 120 and 124 in FIG. 5. Also in accordance with the election of the customer, the facsimile may be sent from the desk top 18. This is indicated at 167 in FIG. 9.

Figure 10:
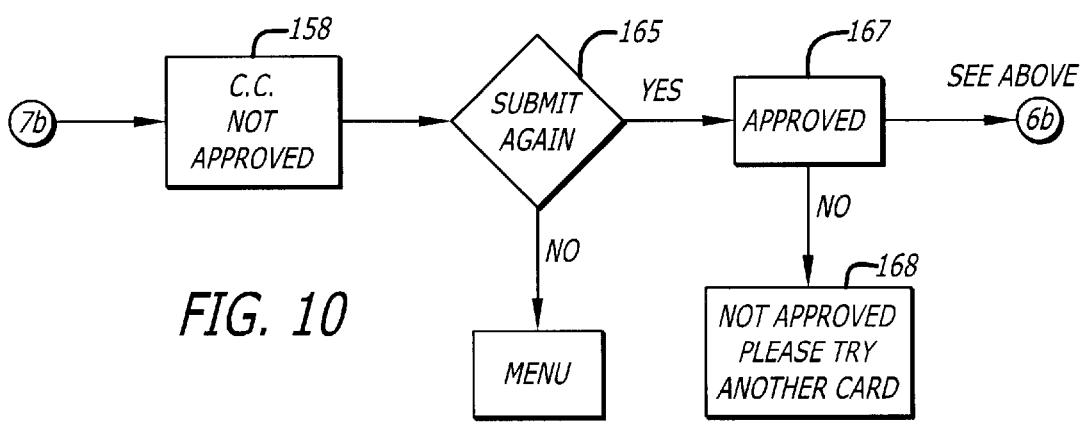

The disapproval of the credit card application is indicated at 158 and terminal 7B at the right end of FIG. 8 and the left end of FIG. 10. The desk top 18 may then submit the application again (see 165 in FIG. 10). This time the application may be approved as at 167 and the steps shown in FIG. 9 and discussed in the previous paragraphs are implemented. If the credit card application is again disapproved as indicated at 168, the web site 16 may suggest to the desk top 18 that the customer submit information from another credit card.

Figure 11:
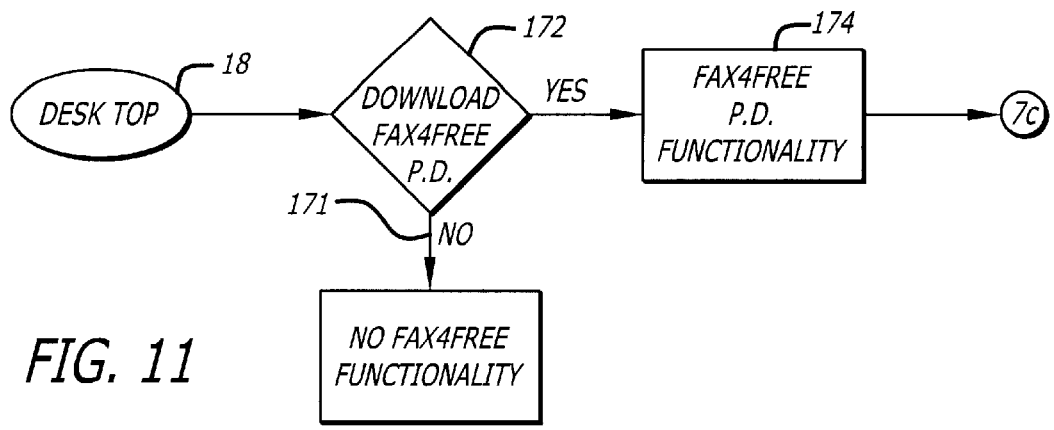
FIGS. 11 through 18 are flow charts showing the steps involved in having the facsimile sent, either on a free basis or a fee basis, from a desk top individual to the customer and pre-connected to the web site.

FIGS. 11–17 are flow charts showing further details in sending a facsimile document or facsimile documents from the desk top 18 in FIG. 1. FIG. 11 includes the desk top 18. As indicated at 171 in FIG. 11, no fax 4 free printer-driver functionality is downloaded when the printer-driver in the desk top does not download the fax 4 free protocol from the web site 16. As indicated at 172, the printer-driver in the desk top downloads the fax 4 free protocol from the web site 16. The desk top then provides a fax for free printer driver functionality. This is indicated at 174 in FIG. 11 This functionality may include such information as a cover sheet, the letterhead format of the customer, the name(s) and address(es) of the customer and recipient(s) and the subject matter of the facsimile. All of this functional information is provided at a terminal 7C at the right end of FIG. 11.

Figure 12:
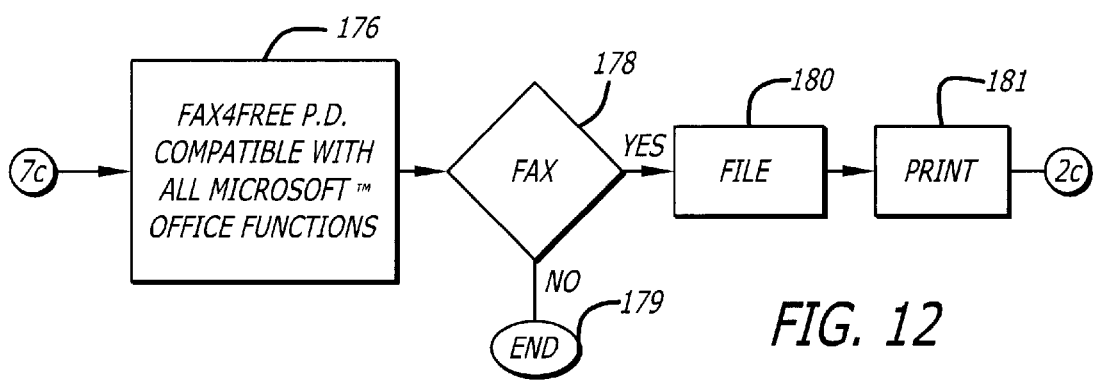

The terminal 7C is also shown at the left end of FIG. 12. A block 176 (not actually forming a part of the flow chart) is shown in FIG. 12 to indicate that the system constituting this invention is compatible with spreadsheets, graphics, text and drawings such as those provided by Microsoft. From the standpoint of the flow charts, the block 176 can be considered to be included in the block 174 in FIG. 11. A decision is then made as at 178 at the desk top 18 as to whether or not to send the facsimile. If the decision is "no", this constitutes the end of the flow chart (see 179). If the decision is made to send the facsimile, the "file" indication at the top of the screen in the desk top is clicked by the mouse in the desk top. This is indicated at 180 in FIG. 12. The "print" indication in the resultant list on the screen of the desk top is then clicked by the mouse as indicated at 181 in FIG. 12.

Figure 13:
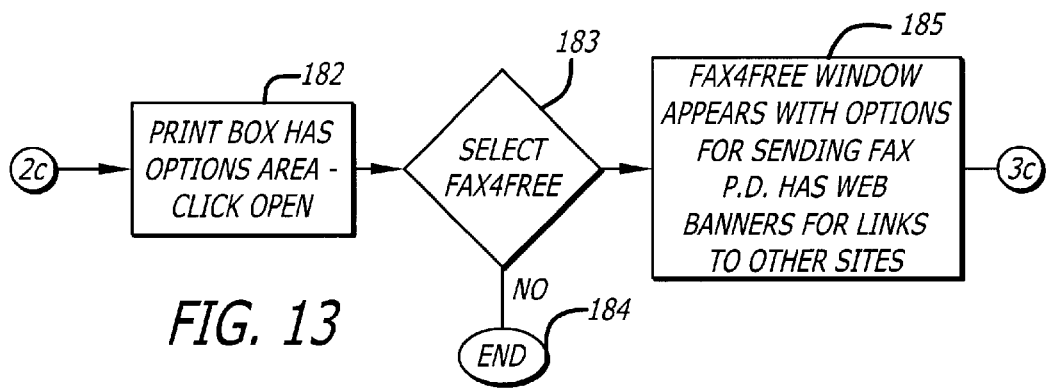

A terminal 2C is provided at the right end of FIG. 12 and at the left end of FIG. 13. A print box 182 is shown in FIG. 13 as extending from the terminal 2C. The print box 182 includes a drop down bar. When the drop down bar is clicked on, a number of different options are provided. One of these is fax for free as indicated at 183 in FIG. 12. If fax for free is not selected, this constitutes the end of the flow chart. See 184 in FIG. 12. If fax for free is selected, a fax for free window appears with different options for sending the fax for free facsimile. This is indicated at 185 in FIG. 13. These different options include a choice by the service provider of an advertisement from among a plurality of different advertisements or banners. A terminal 3C is shown as extending from the window 145.

Figure 14:
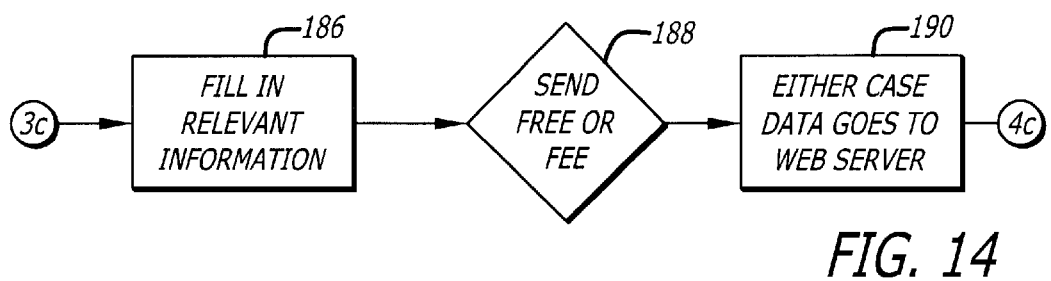

The terminal 3C is also shown at the left end of FIG. 14. A block 186 extends from the terminal 3C. This provides for the insertion by the desk top computer 18 of relevant information such as the information specified at 174 in FIG. 11. The desk top computer 18 is then instructed again to make a choice, as indicated at 188, as to whether to send the facsimile on a free basis or a fee basis. In either case, the facsimile data from the desk top advances to an individual one of the web servers 20a–20c for transmission to the recipient. This is indicated at 190 in FIG. 14. The facsimile message is then shown as being introduced to a terminal 4C.

Figure 15:
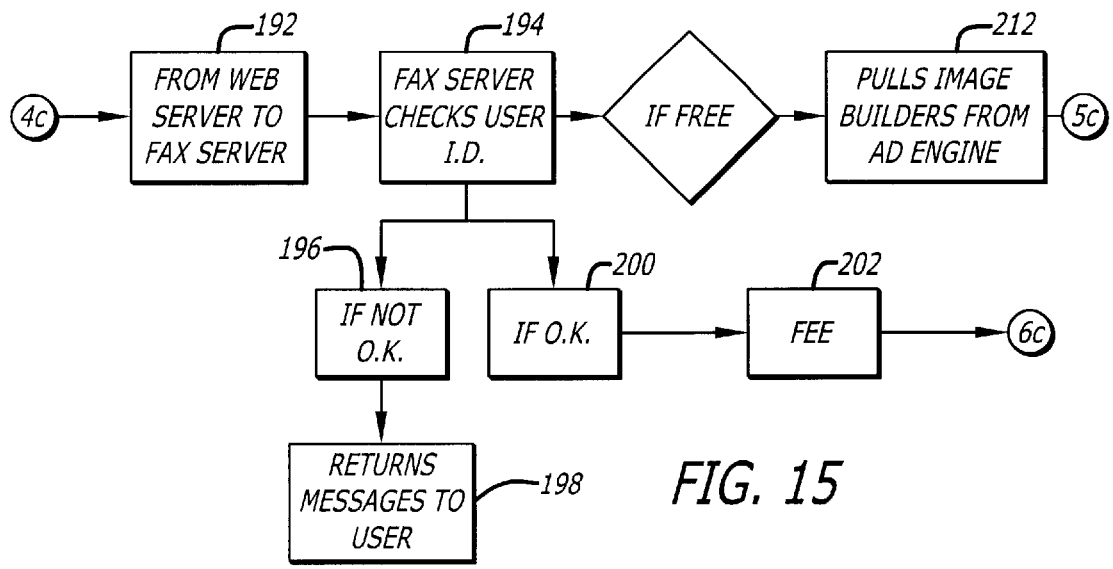
Figure 16:
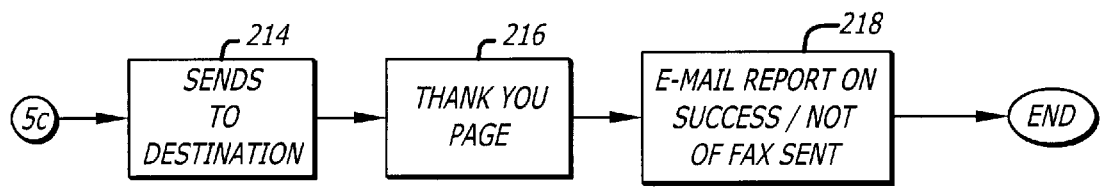
Figure 17:
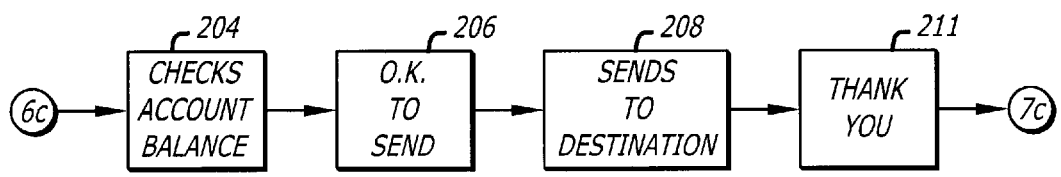

The terminal 4C is also shown in FIG. 15. As indicated at 192 in FIG. 15, the facsimile message is passed from the individual one of the web servers 20a–20c to an individual one of the fax servers 24a–24e. The fax server checks the identification of the user or customer as indicated at 194 in FIG. 15. If the identification is not O.K. (see 196), the facsimile message is returned to the customer or user at the desk top 18 with an indication of what is wrong. This is indicated at 198.

Figure 18:
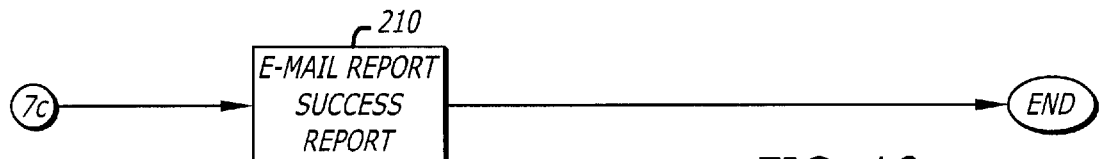

If the identification is O.K. (see 200), a fee may be indicated at 202. The message is then shown as being passed to a terminal 6C at the right end of FIG. 15 and the left end of FIG. 17. The account balance of the customer or user is then checked as at 204 to verify that the customer has a sufficient balance to pay for the cost of sending the facsimile message. When the account balance is sufficient, an indication is provided as at 206 that it is O.K. to send the facsimile message. The message is then sent by the individual one of the fax servers 24a–24e as indicated at 208. This is reported by E-mail to the customer or user as indicated at 210 in FIG. 18. A note of thanks for the customer's business is also provided at 211 in FIG. 17.

When the facsimile is to be sent for free, the individual one of the web servers 20a 20c pulls an image of an advertisement from an ad engine in the web server 16. The ad engine stores a plurality of the advertisements. The pulling of the advertisement from the ad engine is indicated at 212 in FIG. 15. This image is added to the facsimile message to form a composite message and the composite message is sent to the recipient. This is indicated at 214 in FIG. 16. A thank you page is provided as at 216 and an E-mail report is provided as at 218 to the customer or user concerning the successful transmission of the facsimile message to the recipient.

Figure 19:
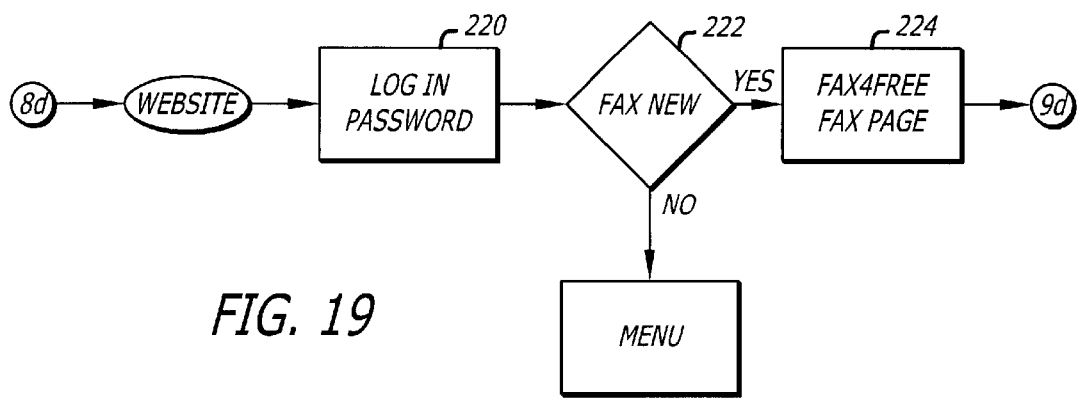

FIGS. 19 through 24 are flow charts showing what happens at the web site 16 in FIGS. 1 and 19. As a first step as indicated at 220 in FIG. 19, the customer or user registers his/her login and password. The customer then makes a decision as at 222 as to whether or not to send the facsimile. If the decision is "no", the customer is referred to the menu 80 (FIG. 25). If the decision is "yes", the customer provides information on a fax for free page as indicated at 224. This information may include the (a) name, address and telephone number of the customer or user, (b) the name, address and telephone number of the recipient and (c) information identifying the facsimile being sent by the customer or user.

Figure 20:
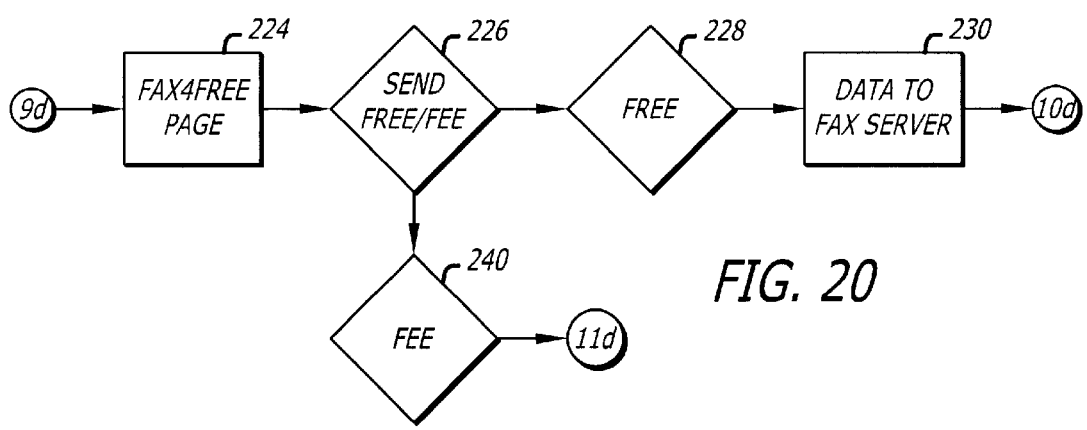

FIG. 19 is shown as providing a terminal 9D at the right end of the Figure and FIG. 20 is shown as providing the terminal 9D at the left end of the Figure. As shown in FIG. 20, the customer or user then determines as at 226 whether to send the facsimile message on a free or a fee basis. If the customer decides to send the facsimile message on a free basis as indicated at 228, the facsimile message is sent to an individual one of the fax servers 24a–24e. This is indicated at 230 in FIG. 20.

Figure 21:
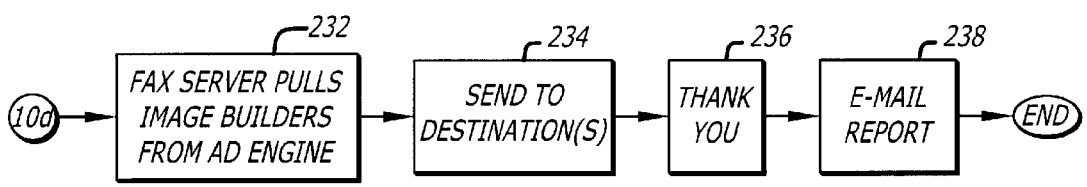

As indicated at 232 in FIG. 21, the individual one of the fax servers 24a–24e pulls an appropriate one of the image builders (the advertisement) from the ad engine which stores the advertisements available for use. The fax server then sends the facsimile message and the advertisement (appropriately placed on the document providing the facsimile message) to the recipient(s). This is indicated at 234 in FIG. 21. The fax server then provides a thank you message (see 236) and an E-mail report (see 238) to the customer or user.

When the customer or user decides to send the facsimile message to the recipient(s) on a fee basis as indicated at 240 in FIG. 20, the individual one of the web servers 20a–20c checks the account balance of the customer. This is indicated at 242 in FIG. 22. If the account balance of the customer is sufficient to pay for the sending of the facsimile message, the web server at the web site 16 indicates as at 244 that it is O.K. to send the facsimile message. The web server then causes the individual one of the fax servers 24a–24e to send the facsimile message (see 246 in FIG. 22). The web server then provides a thank you indication 248 and a confirmation (250 in FIG. 23) to the customer or user.

Figure 22:
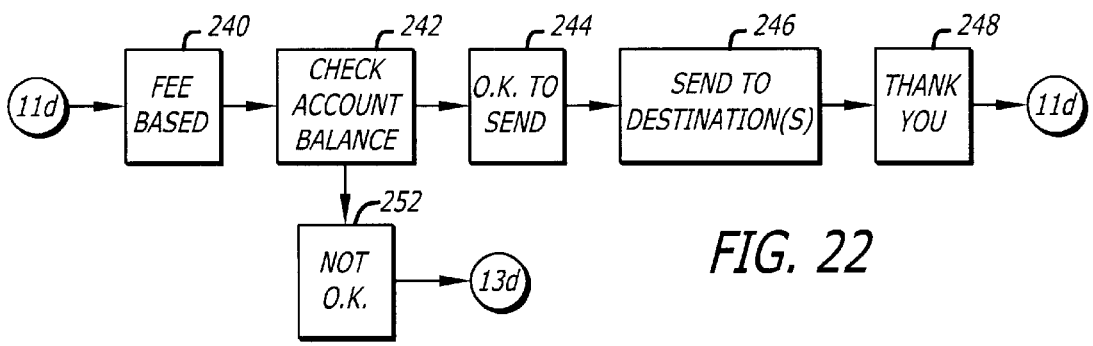

The web server at the web site 16 in FIG. 1 may indicate as at 252 in FIG. 22 that the customer or user does not have a sufficient balance to pay for the cost of sending the facsimile message on a fee basis to the recipient(s). This indication is shown as being provided at a terminal 13D in FIG. 22 and at the terminal 13D in FIG. 24. The web server then indicates to the customer or user the inability of the web server to send the message and the reason because of such money insufficiency. This is indicated at 254 in FIG. 24.

The customer or user may then provide for the insertion of a sufficient sum of money into the customer's account, as indicated at 256, to pay for the cost of sending the facsimile message to the recipient on a fee basis. The account balance of the customer is then adjusted as at 258 and the facsimile message is sent by the individual one of the fax servers 24a–24e to the recipients. A thank you indication as at 248 (see FIG. 23) and a confirmation as at 250 (see FIG. 24) of the sending of the message are then provided by the web site 16 to the customer or user.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A method of sending a facsimile of a message in a document from a user to a recipient, including the steps of:
   providing in an Internet system for the submission to a web site by the user of the document to be sent by facsimile,
   confirming the identity of the user at the web site,
   determining at the web site from the user whether the user wishes to send the facsimile free or at a fee,
   when the user elects to send a facsimile of the message in the document for free to the recipient, adding a message to the message in the document at the web site to compensate for the free sending of the document,
   providing an account of the user at the web site, and
   deducting from the account of the user at the web site the cost of sending the facsimile to the recipient when the user elects to send the facsimile of the document at a fee.

2. A method as set forth in claim 1 wherein
the facsimile is sent to the recipient from the web site through telephone lines whether the sending is on a fee basis or on a free basis.

3. A method as set forth in claim 2 wherein
a confirmation is provided from the web site through the Internet system to the user that the facsimile has been sent to the recipient either on the fee basis or the free basis elected by the user.

4. A method as set forth in claim 1 wherein
the added message is disposed at the web site in an empty space not occupied by the message in the facsimile.

5. A method as set forth in claim 4 wherein
the added message is disposed at the web site in a direction transverse to the message in the facsimile.

6. A method as set forth in claim 1 wherein
a determination is made at the web site whether the account of the user has a sufficient balance to pay for the cost of sending the facsimile when the user elects to send the document at a fee.

7. A method as set forth in claim 6 wherein
the facsimile is sent to the recipient from the web site through telephone lines whether the sending is on a fee basis or on a free basis,
a confirmation is provided from the web site through the Internet system to the user that the facsimile has been sent to the recipient either on the fee basis or the free basis elected by the user,
the added message is disposed at the web site in an empty space not occupied by the message in the facsimile.

8. A method as set forth in claim 7 wherein
the added message is disposed in a direction transverse to the message in the facsimile.

9. A method of sending a facsimile of a message in a document from a user to a recipient, including the steps of:
   providing a web server,
   providing for the passage of a copy of the document to the web server,
   providing at the web server for the user to elect whether to send, the facsimile of the message in the document to the recipient on a free basis or on a fee basis,
   providing at the web server for the insertion of an additional message for inclusion with the facsimile of the message in the document when the user elects to send the facsimile of the message in the document to the recipient on a free basis, and
   providing an account for the user at the web server, and
   deducting at the web server from the account of the user at the web server when the user elects to send the message in the document on a fee basis to the recipient.

10. A method as set forth in claim 9 including the steps of:
    determining at the web server whether the user is a first time user and, if so, obtaining information at the web server concerning the user to establish an account of the user at the web site, and
    when the user elects to send the facsimile of the message in the document on a fee basis and the web server determines that the user has an account at the web server, determining at the web server whether the account has a sufficient balance to pay for the cost of sending the facsimile of the message on a fee basis.

11. A method as set forth in claim 9, including the steps of:
    providing at the web server for the furnishing by the user to the web server of information, including the identity and address of the user and the identity and address of the recipient,for the sending of the facsimile to the recipient.

12. A method as set forth in claim 11, including the steps of:

provide at the web server for the furnishing by the user to the web server of information, including the identity and address of the user and the identity and address of the recipient, for the sending of the facsimile to the recipient, determining at the web server whether the user is a first time user and, if so, obtaining information at the web server concerning the user to establish an account of the user at the web site, and when the user elects to send the facsimile of the message in the document on a fee basis and the web server determines that the user has an account at the web server, determining whether the account has a sufficient balance to pay for the cost of sending the facsimile of the message on a fee basis, the additional message being an advertisement and the additional message being disposed in the facsimile in a space not occupied by the message in the facsimile.

13. A method as set forth in claim 11 wherein the additional message is disposed in a direction transverse to a direction of the message in the facsimile.

14. A method as set forth in claim 9 wherein the additional message is an advertisement and wherein the additional message is disposed in the facsimile in a direction transverse to a direction of the message in the facsimile and wherein the additional message is disposed in the facsimile in a space not occupied by the message in the facsimile.

15. A method as set forth in claim 14 wherein a plurality of additional messages are stored at the web site and wherein the additional message is selected at the web site from the plurality of the stored messages at the web site and wherein, information is provided by the user at the web site concerning the identity of the user and the identity of the recipient before the facsimile of the document, with the inclusion of the additional message, is sent to the recipient.

16. A method as set forth in claim 15 wherein the message and the advertisement in the document include wording and the wording in the additional message in the document is disposed in a direction transverse to the wording of the message in the document.

17. A method of sending a facsimile of a message in a document from a user to a recipient, including the steps of:

providing a web site, providing for a passage of a copy of the message in the document to the web site, providing at the web site for a determination by the user as to whether the user wishes to have the facsimile of the message in the document sent to the recipient on a free basis or on a fee basis, providing at the web site, in response to the election by the user to have a facsimile of the message in the document sent to the recipient on a free basis, for the insertion of an additional message for inclusion with the facsimile at a strategic position not occupied by the message in the document, and providing for a transmission of the facsimile of the message in the document, with the insertion of a facsimile of the additional message, to the recipient.

18. A method as set forth in claim in wherein the additional message constitutes an advertisement.

19. A method as set forth in claim 17 wherein a plurality of additional messages are stored at the web site and wherein the additional message is selected at the web site from the plurality of the stored messages at the web site.

20. A method as set forth in claim 17 wherein information is provided by the user at the web site concerning the identity of the user and the identity of the recipient before the facsimile of the document, with the inclusion of the additional message, is sent to the recipient.

21. A method of sending a facsimile of a message in a document from a user to a recipient, including the steps of:

providing a web server and a facsimile server at a web site, determining in the web server from the user whether the user elects to send the facsimile to the recipient on a free basis or a fee basis, inserting, at the web server for inclusion with the facsimile of the message in the document, an additional message when the user elects to send the facsimile of the document on a free basis to the recipient, providing an account of the user at the web site, deducting from the account of the user at the web site the cost of sending the facsimile to the recipient when the user elects to send the facsimile on a fee basis, and providing for the transfer of the facsimile of the document to the facsimile server without the inclusion of the additional message on a fee basis and with the insertion of the additional message on a free basis.

22. A method as set forth in claim 21 wherein the user elects from a selected one of a web browser and a desk top computer to send the facsimile of the document on a free basis or a fee basis and wherein the web server and the selected one of the web browser and the desk top communicate with each other through the Internet system.

23. A method as set forth in claim 21 wherein the web server provides for the transmission of the facsimile to the recipient on a free basis unless the user elects to send the facsimile on a fee basis.

24. A method as set forth in claim 21 wherein the facsimile server introduces to telephone lines the facsimile provided by the web server to the facsimile to provide for the transmission of the facsimile through the telephone lines to the recipient.

25. A method as set forth in claim 24 wherein the user elects from a selected one of a web browser and a desk top to send the facsimile of the document on a free basis or a fee basis and wherein the web server and the selected one of the web browser and the desk top communicate with each other through the Internet system and wherein, the web server provides for the transmission of the facsimile to the recipient on a free basis unless the user elects to send the facsimile on a fee basis.

26. A method of providing for a sending of a facsimile by a customer to a recipient in an Internet system, including the steps of:

providing for an indication through the Internet system from the customer of the customer's desire to provide for the transmission of the facsimile to the recipient, providing for the customer to indicate through the Internet system whether the customer wishes to send the facsimile free of charge or for a fee, when the customer elects through the Internet system that the customer elects to send the facsimile to the recipient free of charge, providing for the inclusion with the facsimile of printed material which provides for a recovery of the cost to the customer of sending the facsimile to the recipient, thereafter sending the facsimile free of charge through telephone lines to the recipient in accordance with the election by the customer, and when the customer elects through the Internet system to pay for the cost of sending the facsimile through the telephone lines to the recipient, providing for the sending of the facsimile through the telephone lines at a cost to the subscriber.

27. A method as set forth in claim 26, including the steps of:

providing an account for the customer, and when the facsimile is sent through the telephone lines to the subscriber at a cost to the customer, providing in the account of the subscriber, for a debiting of the cost of sending the facsimile.

28. A method as set forth in claim 26 wherein the customer communicates through the Internet system with a web site and wherein the web site sends the facsimile through the telephone lines to the recipient either on the free basis or the fee basis in accordance with the election of the customer.

29. A method as set forth in claim 28 wherein the customer communicates through the Internet system with the web site through a selected one of a web browser and a desk top computer.

30. A method as set forth in claim 29 wherein the customer provides to the web site information concerning the customer and the recipient before the web site sends the facsimile through the telephone lines to the recipient either on the free basis or the fee basis in accordance with the election of the customer.

31. A method as set forth in claim 29, including the steps of:

providing an account for the customer, and when the facsimile is sent through the telephone lines to the subscriber at a cost to the customer, providing in the account of the subscriber for a debiting of the cost of sending the facsimile.

32. A method of providing for a sending of a facsimile by a customer to a recipient from a web site, including the steps of:

providing for an election by the customer as to whether the customer wishes to communicate with the web site from a web browser or a desk top computer, providing for an indication by the customer from the elected one of the web browser and the desk top through the Internet system to the web site whether the customer wishes to send the facsimile free of charge to the recipient or on a fee basis, providing for the passage of the facsimile through the Internet system to the web site from the elected one of the web browser and the desk top, providing at the web site for the addition of a message for inclusion with the facsimile to defray the cost of sending the facsimile on a free basis, and sending the facsimile with the added message from the web site to the recipient.

33. A method as set forth in claim 32 wherein the web site sends the facsimile with the added message through telephone lines to the recipient.

34. A method as set forth in claim 32 wherein the elected one of the web browser and the desk top computer communicates with a web server at the web site and a facsimile server communicates the facsimile with the added message to the recipient.

35. A method as set forth in claim 34 wherein the facsimile server at the web site sends the facsimile with the added message through telephone lines to the recipient.

36. A method as set forth in claim 32, including the steps of:

providing for an election by the customer as to whether the customer wishes to send the facsimile to the recipient on a free basis or a fee basis, and sending the facsimile from the web site to the recipient without any added message when the customer elects to send the message to the recipient on a fee basis.

37. A method as set forth in claim 36 including the steps of:

providing an account for the customer at the web site, and deducting from the account of the customer the cost of sending the facsimile from the web site to the recipient when the customer elects to send the facsimile to the recipient on a fee basis.

38. A method of using the Internet system to provide for a sending of a facsimile by a customer to a recipient, including the steps of:

providing a web site in the Internet system, receiving at the web site in the Internet system an indication from a customer that the customer wishes to send a facsimile to a recipient, requesting at the web site the customer to indicate whether the customer wishes to send the facsimile to the recipient on a free basis or a fee basis, receiving at the web site from the customer an indication that the customer wishes to have the facsimile sent to the recipient with a charge to the customer, determining at the web site whether the customer has an account at the web site and, if so, whether the account has a sufficient balance to pay for the cost of sending the facsimile to the recipient, thereafter sending the facsimile at the web site to the recipient and deducting the cost of the facsimile from the account balance of the customer.

39. A method as set forth in claim 38 wherein a web server is provided at the web site to communicate with the customer through the Internet system concerning the facsimile to be sent by the web site to the recipient on behalf of the customer.

40. A method as set forth in claim 38 wherein a facsimile server is provided at the web site to transmit the facsimile through telephone lines to the recipient.

41. A method as set forth in claim 38 wherein the web site adds a message for inclusion with the facsimile when the customer elects to send the facsimile to the recipient on a free basis and before the web site sends the facsimile to the recipient.

42. A method as set forth in claim 41 wherein a web server is provided at the web site to communicate with the customer through the Internet system concerning the facsimile to be sent by the web site to the recipient on behalf of the customer and wherein a facsimile server is provided at the web site to transmit the facsimile, with or without the inclusion of the added message, through telephone lines to the recipient.

43. A method of providing for a sending of a facsimile by a customer to a recipient in an Internet system, including the steps of:

providing a web site in the Internet system, providing a desk top computer for the customer in the Internet system, providing a web browser in the Internet system, providing for the receipt at the web site of a request by the customer from an elected one of the web browser or the desk top computer to send a facsimile to the recipient, providing for a communication between the web site and the elected one of the web browser and the desk top computer as to whether the customer wishes to send the facsimile on a fee basis or a free basis to the recipient, and providing for the transmission of the facsimile from the web site to the recipient on a fee basis or a free basis in accordance with the request of the customer.

44. A method as set forth in claim 43 wherein a message is added at the web site for inclusion with the facsimile sent from the web site to the recipient to defray the cost of sending the facsimile when the customer elects to send the message on a free basis.

45. A method as set forth in claim 43 wherein the web site communicates through the Internet system with the elected one of the web browser and the desk top concerning the fee to be paid by the customer and the payment of the fee when the customer elects to send the facsimile to the recipient on a fee basis.

46. A method as set forth in claim 43 wherein the web site communicates with the individual one of the web browser and the desk top computer from a web server at the web site and wherein the web site transmits the facsimile to the recipient through telephone lines from a facsimile server at the web site.

47. A method as set forth in claim 46 wherein a message is added at the web site for inclusion with the facsimile sent from the web site to the recipient to defray the cost of sending the facsimile when the customer elects to send the facsimile on a free basis and wherein the web site communicates through the Internet system with the elected one of the web browser and the desk top computer concerning the fee to be paid by the customer and the payment of the fee when the customer elects to send the facsimile to the recipient on a fee basis.

48. In combination for sending a facsimile to a recipient on behalf of a customer, a web site, a web server at the web site for determining from the customer whether the customer wishes to send the facsimile on a free basis or a fee basis and for adding a message for inclusion with the facsimile to defray the cost of the facsimile upon the election of the customer to send the facsimile on a free basis and for providing for a charging of the customer upon an election of the customer to send the facsimile on a fee basis, and a facsimile server at the web site for sending the facsimile, with the inclusion of the added message or without the inclusion of the added message dependent upon the election of the customer to send the message, for free or for a fee, through telephone lines to the recipient.

49. In a combination as set forth in claim 48 wherein the added message is an advertisement and wherein the advertisement is selected by the web server at the web site from a plurality of advertisements at the web site.

50. In a combination as set forth in claim 48 wherein the facsimile is disposed in successive horizontal lines vertically disposed relative to one another and has blank spaces at the opposite ends and wherein the added message is disposed by the web server at the web site vertically in at least one of the blank spaces.

51. In combination for sending a facsimile to a recipient on behalf of a customer, an individual one of a web browser and a desk top computer, a web site displaced from the individual one of the web browser and the desk top computer, the web site and the individual one of the web browser and the desk top computer being constructed to communicate with each other through the Internet system, the web site including a web server for receiving from the individual one of the web browser and the desk top computer an election as to whether to transmit the facsimile to the recipient on a free basis or a fee basis and for adding a message for inclusion with the facsimile upon an election by the customer to transmit the message on a free basis, the web server providing an account of the customer and providing for a deduction from the account of the cost of sending the facsimile to the recipient upon the election of the customer to send the facsimile on a fee basis, the web site including a facsimile server for sending the facsimile, with the inclusion of the added message upon the election of the customer to send the facsimile on a free basis and without the inclusion of the added message upon the election of the customer to send the facsimile on a fee basis, through telephone lines to the recipient.

52. In a combination as set forth in claim 51 wherein the added message is an advertisement and wherein the advertisement is selected by the web server at the web site from a plurality of advertisements at the web site.

53. In a combination as set forth in claim 51 wherein the facsimile is disposed in successive horizontal lines vertically disposed relative to one another and has blank spaces at the opposite ends and wherein the added message is disposed by the web server at the web site vertically in at least one of the blank spaces.

* * * * *